(No Model.) 7 Sheets—Sheet 4.

T. R. MORGAN, Sr.
FLANGING MACHINE.

No. 298,224. Patented May 6, 1884.

Witnesses
Jno. R. Morgan
Henry Heer

Inventor
Thos. R. Morgan (No Model.)  
T. R. MORGAN, Sr.  
FLANGING MACHINE.
No. 298,224. Patented May 6, 1884.
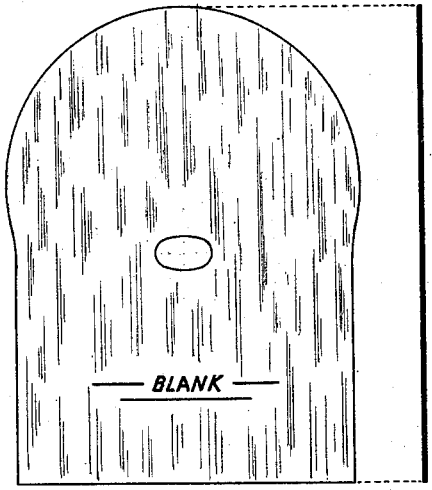
~ *Fig. 6.* ~
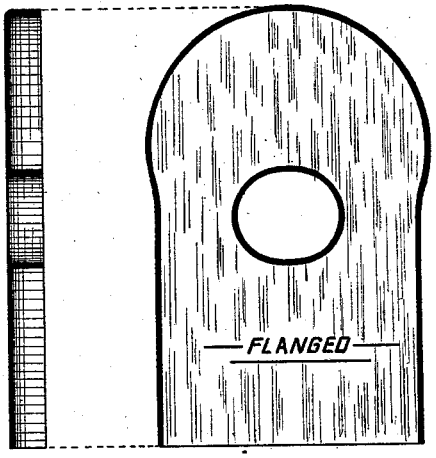
~ *Fig. 7.* ~
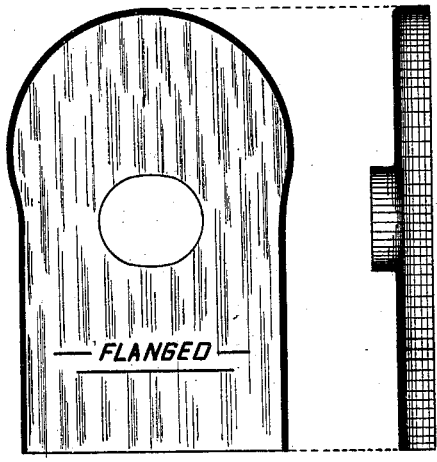
~ *Fig. 8.* ~
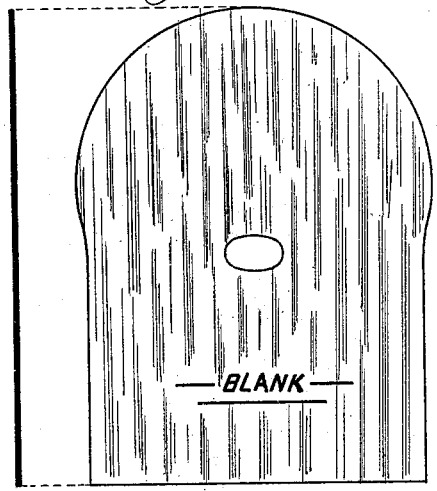
~ *Fig. 9.* ~

(No Model.) 7 Sheets—Sheet 6.

T. R. MORGAN, Sr.
FLANGING MACHINE.

No. 298,224. Patented May 6, 1884.

Witnesses: Jno. R. Morgan, Henry Heer
Inventor: Tho's R. Morgan, Sr.
By H. A. Symons, Atty.

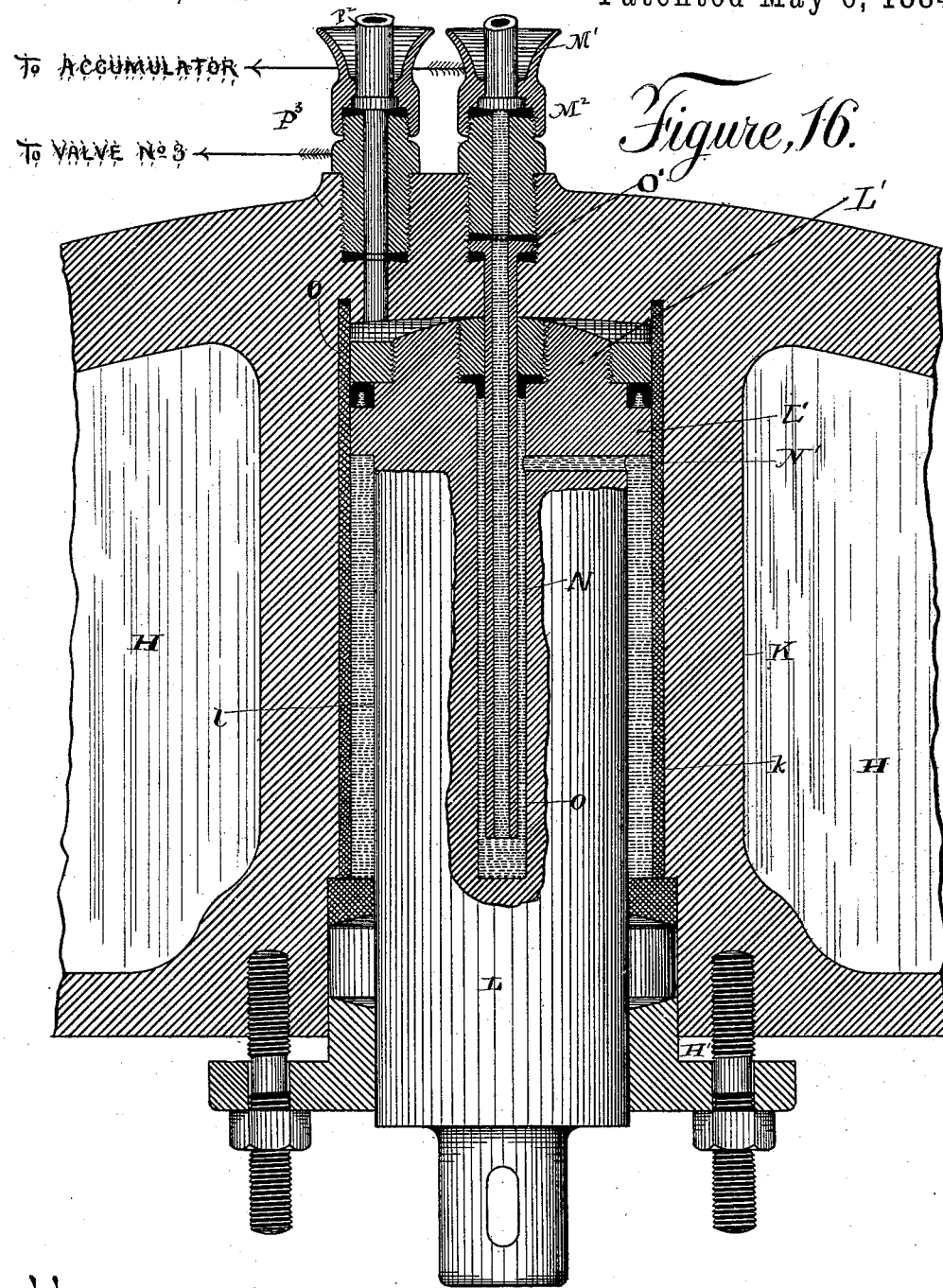

UNITED STATES PATENT OFFICE.

THOMAS R. MORGAN, SR., OF ALLIANCE, OHIO.

FLANGING-MACHINE.

SPECIFICATION forming part of Letters Patent No. 298,224, dated May 6, 1884.

Application filed October 29, 1883. (No model.)

*To all whom it may concern:*

Be it known that I, THOMAS R. MORGAN, Sr., of Alliance, in the county of Stark and State of Ohio, have invented certain new and useful Improvements in Flanging-Machines; and I do hereby declare the following to be a full, clear, and exact description of the invention, such as will enable others skilled in the art to which it appertains to make and use the same.

My invention relates to an improvement in hydraulic flanging-machines, the object being to provide a flanging-machine adapted to completely flange large iron or steel plates, such as locomotive-furnace fronts, &c.; and with this end in view my invention consist in certain features of construction and combinations of parts, as will be hereinafter described, and pointed out in the claims.

Figure 1:
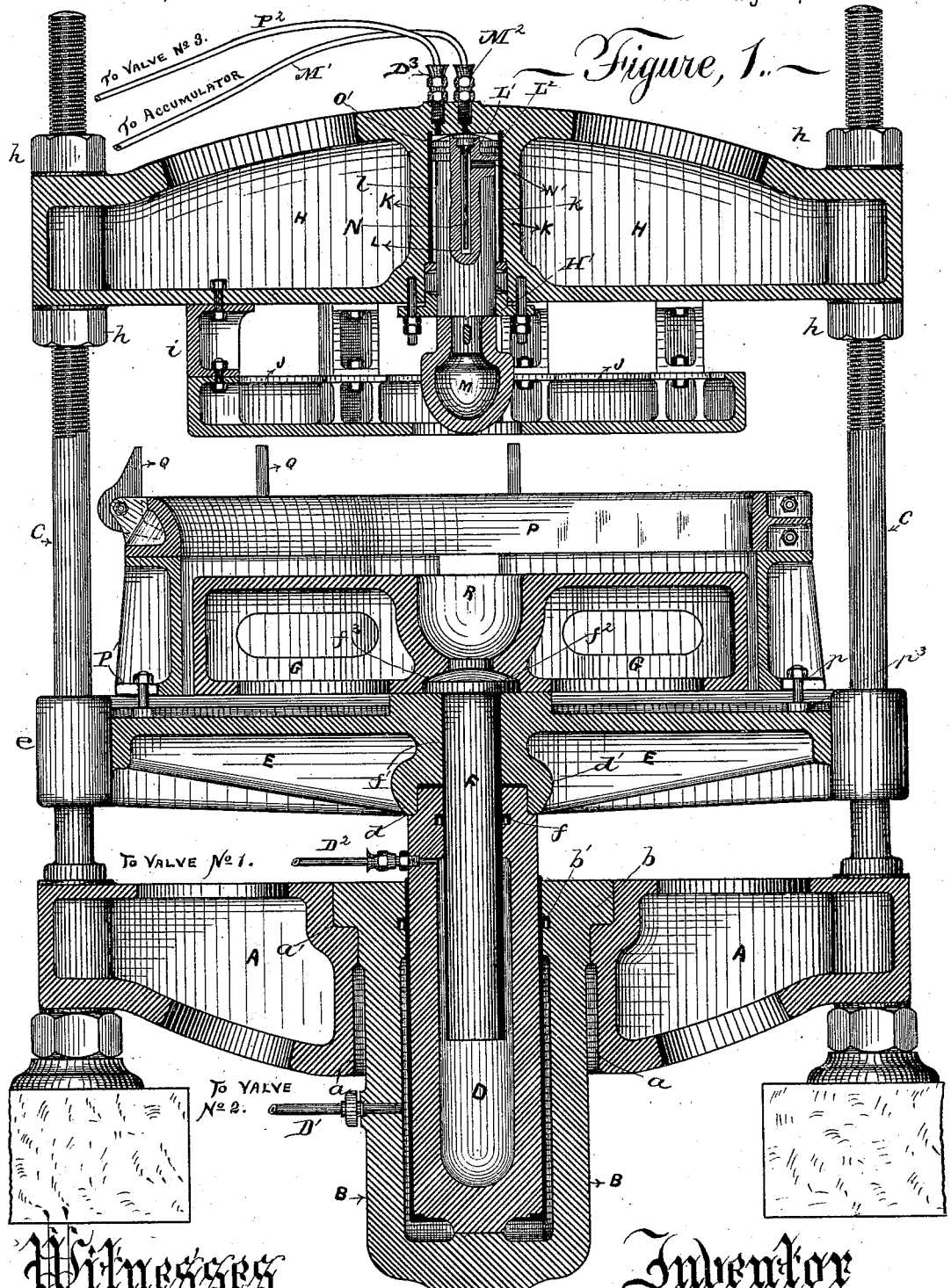
Figure 2:
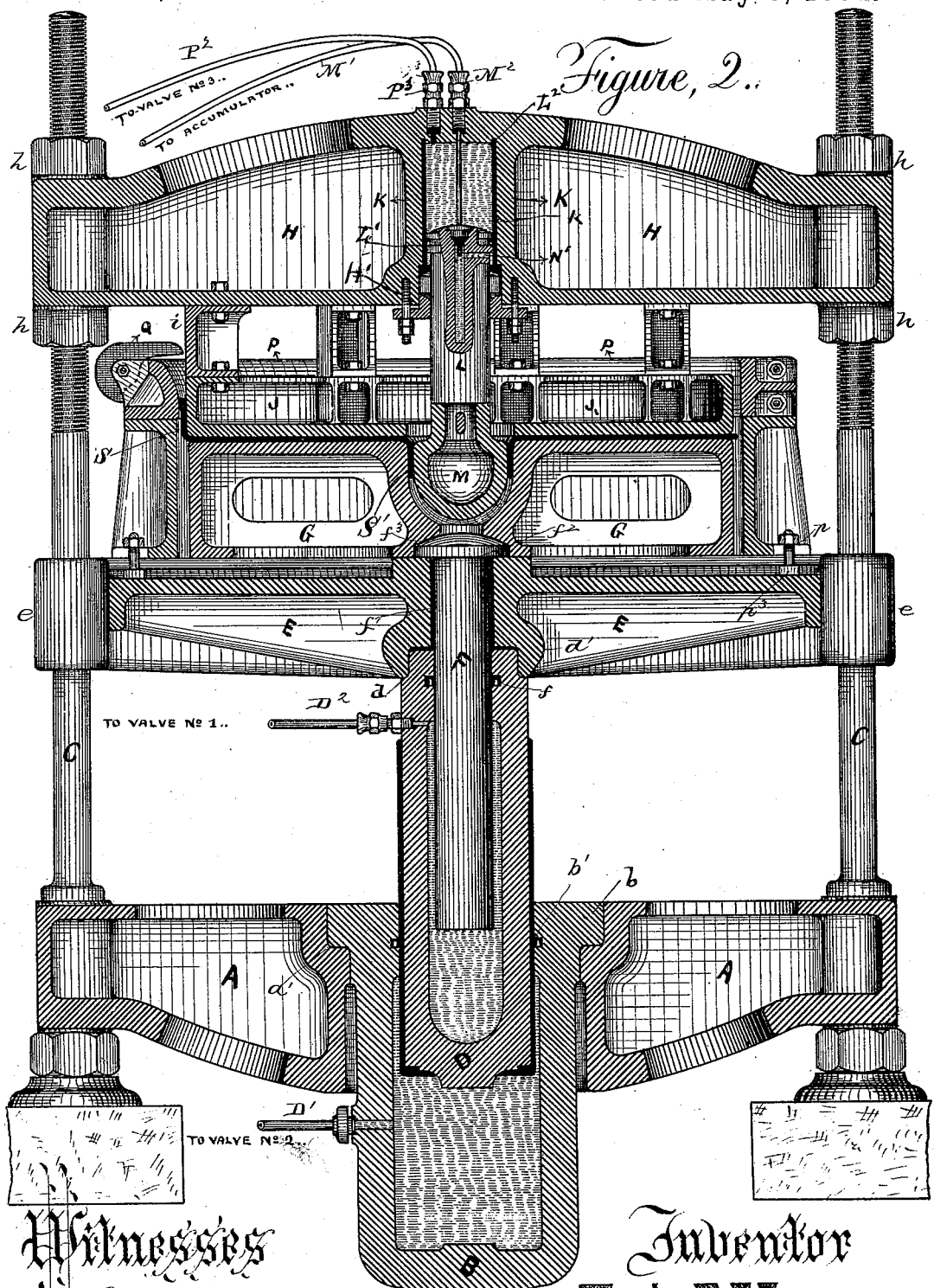
Figure 3:
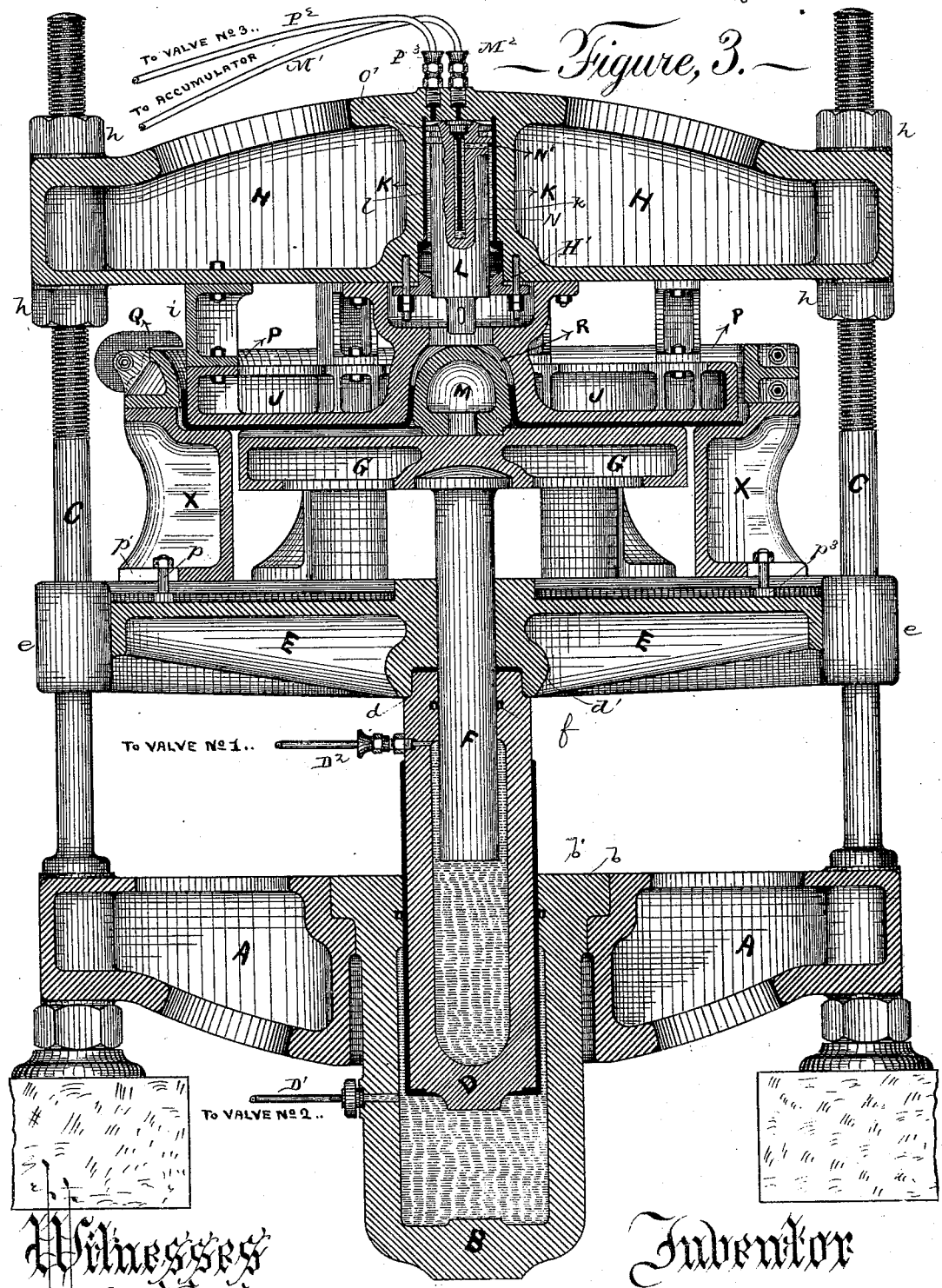
Figure 4:
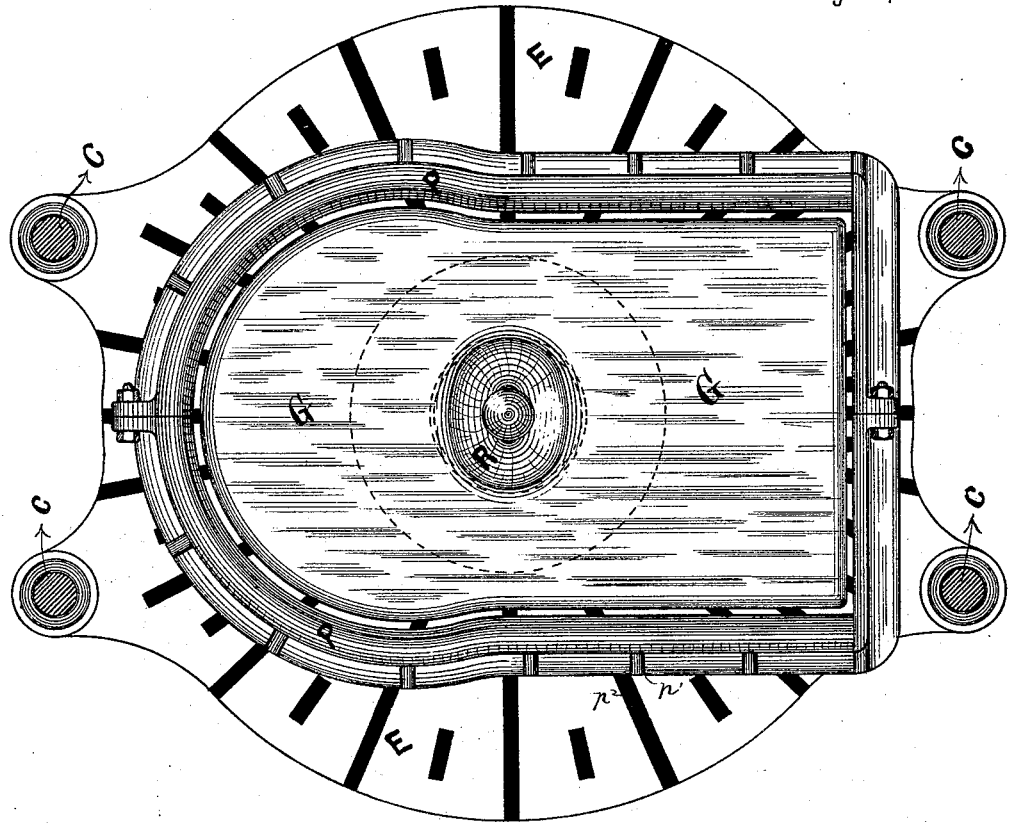
Figure 5:
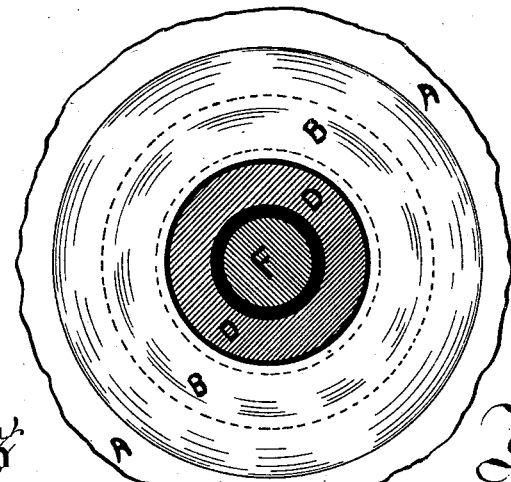

In the accompanying drawings, Figure 1 is a view, partly in side elevation and partly in vertical section, of my improved flanging-machine. Fig. 2 is a similar view showing the plate after it has been flanged and prior to its removal from the machine. Fig. 3 is a modification. Fig. 4 is a plan view of the tables and dies. Fig. 5 is a plan view of the cylinder and transverse section of the rams located therein. Figs. 6, 7, 8, 9, 10, 11, 12, 13, 14, and 15 show plan and sectional views of some of the various types of flanging which may be done on my improved machine. Fig. 16 is a vertical section of the ram and cylinder for flanging fire-doors.

A represents the base of the machine, which may be rectangular or of any other desired shape, and is provided with an opening, $a$, having an annular seat or shoulder, $a'$.

Within the opening $a$ is placed a cylinder, B, which is provided at its upper end with an outwardly-projecting flange, $b$, that rests upon the annular shoulder $a'$ of the base.

Within the cylinder B is located a ram, D, preferably provided with a gun-metal casing, and suitably packed by an inverted double-cup leather in a water-groove, $b'$, situated near the upper end of cylinder B, or any other desired means for packing the ram D. The upper end of the ram D is constructed with an annular shoulder, $d$, upon which is supported the central boss, $d'$, of the table E, the latter having perforated bosses $e$ at its outer edge, which encircle the four upright columns C, the latter being secured at their lower ends to the base A. Thus the columns C serve as guides for the table E. Matrix-die P is secured to the table E by means of bolts $p$, extending through open slots $p'$ in the outwardly-projecting lower flange, P', and undercut grooves $p^2$, formed in the upper face of the table E, the heads $p^3$ of the bolts engaging in said undercut grooves, as clearly shown in Figs. 1 and 4, whereby the matrix-die is enabled to be secured in any desired lateral or horizontal adjustment.

Within the ram D is a smaller ram, F, which is packed by an inverted double-cup leather in an annular water-groove, $f$, formed in the upper portion of ram D. The ram F extends upwardly through an opening, $f$, formed in the table E, and is provided at its upper end with a head, $f^2$, which fits into a recess, $f^3$, formed in the holding-up table G, the latter being located within the matrix-die P, and is of a sufficiently smaller diameter than the latter, so as to allow of its free independent vertical movement therein. A pipe, D', communicates with the cylinder B, and leads to a valve designated as "valve 2" of an accumulator, while a pipe, $D^2$, communicates with the bore or opening within the ram D, and connects with a valve designated as "valve 1" of the accumulator.

It is not necessary to show or describe the accumulator with its valves, it being sufficient to state that any approved construction of accumulator may be used, it having separate valves and connections for conveying water under pressure to the cylinder B and ram D, whereby the rams D and F may be operated separately and independently, and subjected to different pressures, as desired. These rams are so constructed and arranged that on releasing the pressure the ram D will descend until it rests upon the bottom of the cylinder B, while the ram F will descend until the table G rests on the table E, and thus by these means the entire pressure of the large ram D may be brought to bear on the holding-up table, for a purpose hereinafter described.

The upper ends of the columns C are screw-threaded, as shown, and extend through openings formed in the outer edges of the head-table H, which latter is secured in any desired vertical adjustment by means of the nuts $h$.

To the under side of the head-table H is suspended by suitable brackets, $i$, or other devices the male die or former J.

In the table H is formed a cylinder, K, preferably provided with a gun-metal bushing, $k$. Within this cylinder is located a ram, L, which is provided at its upper end with a piston, L', the latter being furnished with an inverted double-cup leather, $L^2$, that serves to prevent any flow of water upwardly past the piston, while it allows of a downward flow past the same. The lower end of the cylinder K is provided with a stuffing-box, H', which packs the ram L.

To the lower end of the ram L is secured a male die or former, M, which serves for flanging fire-doors or other similar apertures in the plate, illustrated in Figs. 8 and 9.

The ram L is constructed to form an annular space, $l$, (clearly illustrated in Fig. 16,) which space is always in communication with an accumulator, the water being conveyed to and from said annular space through a pipe or tube, M', a coupling, $M^2$, attached to the head-table H, and through a pipe or tube, N, one end of which connects with the coupling $M^2$, while the other end extends downwardly into a chamber, O, formed in the ram, said tube being packed by a stuffing-box, O', in the top of the ram, thereby forming a telescopic joint between the ram and tube. The chamber O in the ram communicates with the annular chamber $l$ by means of a transverse port or opening, N', whereby the water from the accumulator is allowed to flow through the pipe or tube M', coupling $M^2$, tube O, and port or passage N' into the annular space $l$, and serves to force the ram upwardly. The ram is forced downwardly by means of water conducted from the accumulator through pipe $P^2$ and coupling $P^3$ against the upper end of the ram or piston.

It will be observed that the pressure on the ram to force it through its downward or its working stroke corresponds to the area of the upper end of the ram, while the ram is forced upward by a pressure equal to the difference between the area of the piston and the ram.

Having described the details of construction and relative arrangement of parts of my improvement in flanging-machines, I will now describe its operation.

The table G is raised by the ram F until the upper surface of the table stands a little above the matrix P. The plate to be operated upon and raised to a red heat is now drawn over the table G and adjusted to its proper position. Table G is now caused to ascend until the plate is brought in contact with the lower base of the guide J, the pressure of the ram F operating to press and straighten the plate between the adjacent surfaces or bases of the table and die. The larger ram, D, carrying the table E and matrix P, is now forced upwardly, the latter, in conjunction with the periphery of the guide or die J, operating to form the flange S on the outer edge of the plate. The ram D continues its stroke until the table E again bears against the under side of the table G, whereby the entire pressure of the larger ram is exerted upon the whole surface of the plate, thus completing the process of smoothing and straightening the plate. While the parts are in the position described, the ram L is forced downwardly, causing its die M to form the flange S' within the matrix R, all as represented in Fig. 2. Water from the accumulator is then conducted through the tube or pipe M', coupling $M^2$, tube N, and through passage N' into the annular chamber $l$, which operates to raise the ram and disengage the die M from the plate. Strippers Q are then knocked down to the position shown in Fig. 2, in which position they will project over the upper edge of the flange S, formed on the plate. Pressure upon the rams D F being released, tables G E will descend until the strippers Q rest upon the edge of the flange, whereby the entire weight of the tables G E is brought to bear in stripping the plate from the die J, which is sufficient, under ordinary conditions, to accomplish this result. However, should the plate become so firmly shrunk upon the die J that the combined weight of the tables G E will not operate to strip the plate from the die, a block may be inserted between the plate and the die J, so as to cover the matrix R. Then by forcing the ram L downwardly against the block its pressure, together with the weight of the tables G E, will serve to strip the plate from the die J.

Figure 10:
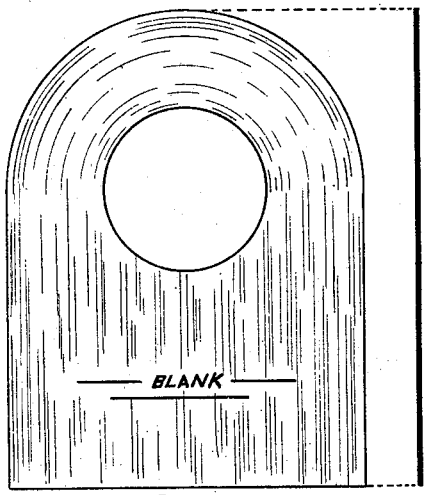
Figure 11:
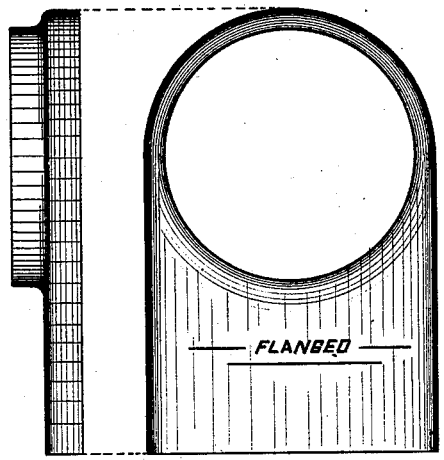
Figure 12:
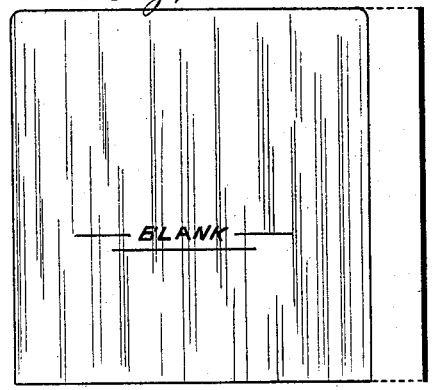
Figure 13:
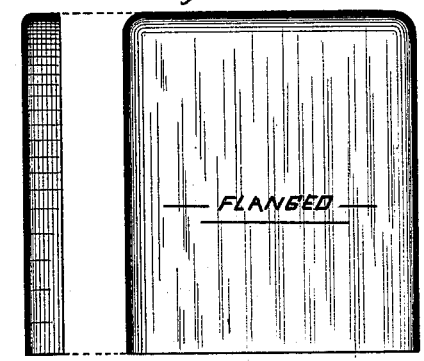
Figure 14:
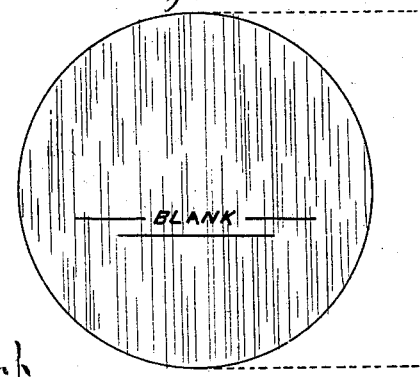
Figure 15:
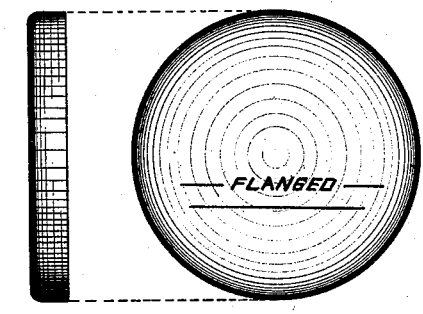

Instead of making the cylinder K integral with the head-plate H, it may be made independent thereof, and located one side of the center to produce door-flanges at one side or end of the plate, as represented in Figs. 10 and 11 of the drawings. Again, it is necessary to invert the die M for flanging fire-doors in which the flange turns in the same direction as the main outside flange, examples of which are shown in Figs. 6 and 7 of the drawings.

The machine with the die inverted is represented in Fig. 3, wherein said die is secured to the top of the holding-up plate G, while the matrix R is formed in the die J. In this arrangement of parts a space is provided between tables G E sufficient to enable the table G to be withdrawn for the insertion of the die M; also, the brackets X are constructed to extend inwardly a distance sufficient to distribute the pressure of the ram D over a large surface of the plate during the formation of the inner flange.

It is evident that many slight changes in the construction and relative arrangement of parts might be resorted to without departing from the spirit of my invention, and hence I do not restrict myself to the exact construction and arrangement of parts shown and described; but, Having fully described my invention, what I claim as new, and desire to secure by Letters Patent, is—

1. In a flanging-machine, the combination, with a ram, and a table connected to the ram and provided with a matrix, of a holding-up table adapted to be operated within the matrix, having an independent ram connected therewith, substantially as set forth.

2. In a flanging-machine, the combination, with a ram, and a table connected therewith and provided with a matrix, of a holding-up table provided with an independent ram, and a stationary forming-die located above said matrix, substantially as set forth.

3. In a flanging-machine, the combination, with a matrix, a holding-up table, and independent rams for operating the matrix, and a forming-die located above the matrix, said parts constructed and adapted to flange the outer edge of the plate, of an independent ram, forming-die, and matrix for flanging an aperture in the plate, substantially as set forth.

4. In a flanging-machine, the combination, with a stationary forming-die, J, table E, matrix P, and ram D, of the holding-up table G, adapted to rest upon the table E, and ram F, arranged to operate within the ram D, substantially as and for the purpose set forth.

5. In a flanging-machine, the combination, with the tables G E, rams F D, forming-die J, and matrix P, of the strippers Q, substantially as and for the purpose set forth.

6. In a flanging-machine, the combination, with the cylinder K, of the ram L, provided with a piston at its upper end, and a chamber having a passage communicating with an annular space around the ram, and a tube inserted within the chamber in the ram for supplying water under pressure thereto, substantially as and for the purpose set forth.

7. In a flanging-machine, the combination, with the matrix R, of the forming-die M, ram L, the latter provided with a piston at its upper end, and devices, substantially as described, for supplying water under pressure to the opposite sides of said piston, substantially as and for the purpose set forth.

In testimony whereof I have signed this specification in the presence of two subscribing witnesses.

THOS. R. MORGAN, Sr.

Witnesses:
 JOHN H. LLOYD,
 EBENEZER A. W. JEFFERIES.